United States Patent
Chong et al.

(10) Patent No.: US 11,151,640 B2
(45) Date of Patent: *Oct. 19, 2021

(54) DYNAMIC GENERATION OF USER INTERFACE ELEMENTS

(71) Applicant: eBay Inc., San Jose, CA (US)

(72) Inventors: Huai-ter Chong, Saratoga, CA (US); Yun Liu, Cupertino, CA (US)

(73) Assignee: eBay Inc., San Jose, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 16/384,436

(22) Filed: Apr. 15, 2019

(65) Prior Publication Data

US 2019/0244280 A1   Aug. 8, 2019

Related U.S. Application Data

(63) Continuation of application No. 14/677,912, filed on Apr. 2, 2015, now Pat. No. 10,332,194.

(51) Int. Cl.
| | | |
|---|---|---|
| *G06Q 30/00* | (2012.01) | |
| *G06Q 30/06* | (2012.01) | |
| *G06Q 30/08* | (2012.01) | |
| *G06F 8/38* | (2018.01) | |
| *G06F 9/445* | (2018.01) | |

(52) U.S. Cl.
CPC .......... *G06Q 30/0641* (2013.01); *G06F 8/38* (2013.01); *G06F 9/4451* (2013.01); *G06Q 30/08* (2013.01)

(58) Field of Classification Search
None
See application file for complete search history.

(56) References Cited

U.S. PATENT DOCUMENTS

| | | | |
|---|---|---|---|
| 10,332,194 B2 | 6/2019 | Chong et al. | |
| 2008/0147566 A1* | 6/2008 | Malik | G06Q 30/08 705/36 R |
| 2009/0265646 A1 | 10/2009 | Cho et al. | |
| 2010/0312664 A1 | 12/2010 | Roseman et al. | |
| 2013/0232024 A1 | 9/2013 | Nassiri | |
| 2015/0178872 A1* | 6/2015 | VonBergen | G06Q 30/0633 705/80 |
| 2016/0042447 A1* | 2/2016 | Nassiri | G06Q 30/0641 705/26.3 |

(Continued)

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — FIG. 1 Patents

(57) ABSTRACT

In various example embodiments, a system and method for dynamically generating user interface elements and associated values are presented. An item listing and profile data are accessed. A set of user interface elements are dynamically generated based on the item listing and the profile data, with each user interface element configured to perform an action on the item listing. A set of values are dynamically determined, with each value being associated with a user interface element of the set of user interface elements. The set of user interface elements are then caused to be presented within the item listing.

20 Claims, 11 Drawing Sheets

(56) References Cited

U.S. PATENT DOCUMENTS

2016/0063065 A1    3/2016    Khatri et al.
2016/0291807 A1    10/2016    Chong et al.

OTHER PUBLICATIONS

Dave Cliff; "Minimal-Intelligence Agents for Bargaining Behaviors in Market-Based Environments"; Jun. 1997; School of Cognitive and Computing Sciences University of Sussex (Year: 1997).*

Advisory Action received for U.S. Appl. No. 14/677,912, dated Jul. 25, 2018, 3 pages.

Applicant-Initiated Interview Summary received for U.S. Appl. No. 14/677,912, dated Jun. 27, 2018, 3 pages.

Applicant-Initiated Interview Summary dated Aug. 24, 2018, for U.S. Appl. No. 14/677,912, 4 pages.

Applicant-Initiated Interview Summary received for U.S. Appl. No. 14/677,912, dated Sep. 7, 2018, 3 pages.

Final Office Action received for U.S. Appl. No. 14/677,912, dated Jun. 15, 2018, 19 pages.

First Action Interview—Office Action Summary received for U.S. Appl. No. 14/677,912, dated Feb. 2, 2018, 19 pages.

Notice of Allowance received for U.S. Appl. No. 14/677,912, dated Feb. 12, 2019, 9 pages.

Pre-Interview First Office Action received for U.S. Appl. No. 14/677,912, dated Nov. 2, 2017, 17 pages.

Response to Final Office Action filed on Jul. 9, 2018, for U.S. Appl. No. 14/677,912, dated Jun. 15, 2018, 18 pages.

Response to First Action Interview Office Action Summary filed on Apr. 2, 2018, for U.S. Appl. No. 14/677,912, dated Feb. 2, 2018, 25 pages.

Response to Pre-Interview Communication filed on Dec. 29, 2017, for US. Appl. No. 14/677,912, dated Nov. 2, 2017, 5 Pages.

Supplemental Amendment filed for U.S. Appl. No. 14/677,912, dated Sep. 14, 2018, 14 pages.

csharp.net-informations.com, "How to create Dynamic Controls inC#?", Retrieved from the internet URL: <http://csharp.net-informations.com/gui/dynamic-controls-cs.htm)>, Mar. 30, 2014, 3 pages.

QIN "Introduction to E-commerce", Springer, 2009, 527 pages.

* cited by examiner

U.S. $ 125.00 +$13.10 for shipping
4d 00h left | 14 Bids
— 708

! You've been outbid by someone else's max bid. You can still win! Try bidding again.

Choose max bid (?)

Bid U.S. $ 127.50 — 702
Bid U.S. $ 205.00 — 704
Bid U.S. $ 375.00 — 706
— 700

OR

Enter a custom max bid of U.S. $127.50 or more (?)

U.S. $

Place max bid

By placing a bid, you're committing to buy this item if you win.

DYNAMIC GENERATION OF USER INTERFACE ELEMENTS

CLAIM OF PRIORITY

This application is a continuation of and claims priority to U.S. patent application Ser. No. 14/677,912, filed Apr. 2, 2015, entitled "Dynamic Generation of User Interface Elements", the entire disclosure of which is hereby incorporated by reference herein in its entirety.

TECHNICAL FIELD

Embodiments of the present disclosure relate generally to data processing and, more particularly, but not by way of limitation, to dynamic generation of user interface elements.

BACKGROUND

Conventionally, user interface elements are generated prior and embedded during design time of a website. Where user interface elements are used to purchase items on a website, the user interface elements are conventionally associated with a value prior to serving the web site or act as a data entry field to receive a value determined by a user. Further, conventional websites using static values associated with selectable icons provide no guidance to a user in bidding strategies, trending prices, or values likely to enable the bidding user to win an item at auction. As a result, a user looking to make a purchase, bid on an item in an auction, or make an offer on a product performs their own due diligence as to trending prices, likely winning bids, or expected prices. Dynamically generating user interface elements and associated values based on information about the user and the item being purchased will increase the likelihood of the user making a purchase as well as future purchases based on increased familiarity and success with the web site.

BRIEF DESCRIPTION OF THE DRAWINGS

Various ones of the appended drawings merely illustrate example embodiments of the present disclosure and cannot be considered as limiting its scope.

FIG. 7 is an interface diagram illustrating example dynamically generated user interface elements generated and displayed by the user interface element generation system, according to some example embodiments.

FIG. 8 is an interface diagram illustrating a notification generated by the user interface element generation system, according to some example embodiments.

Figure 1:
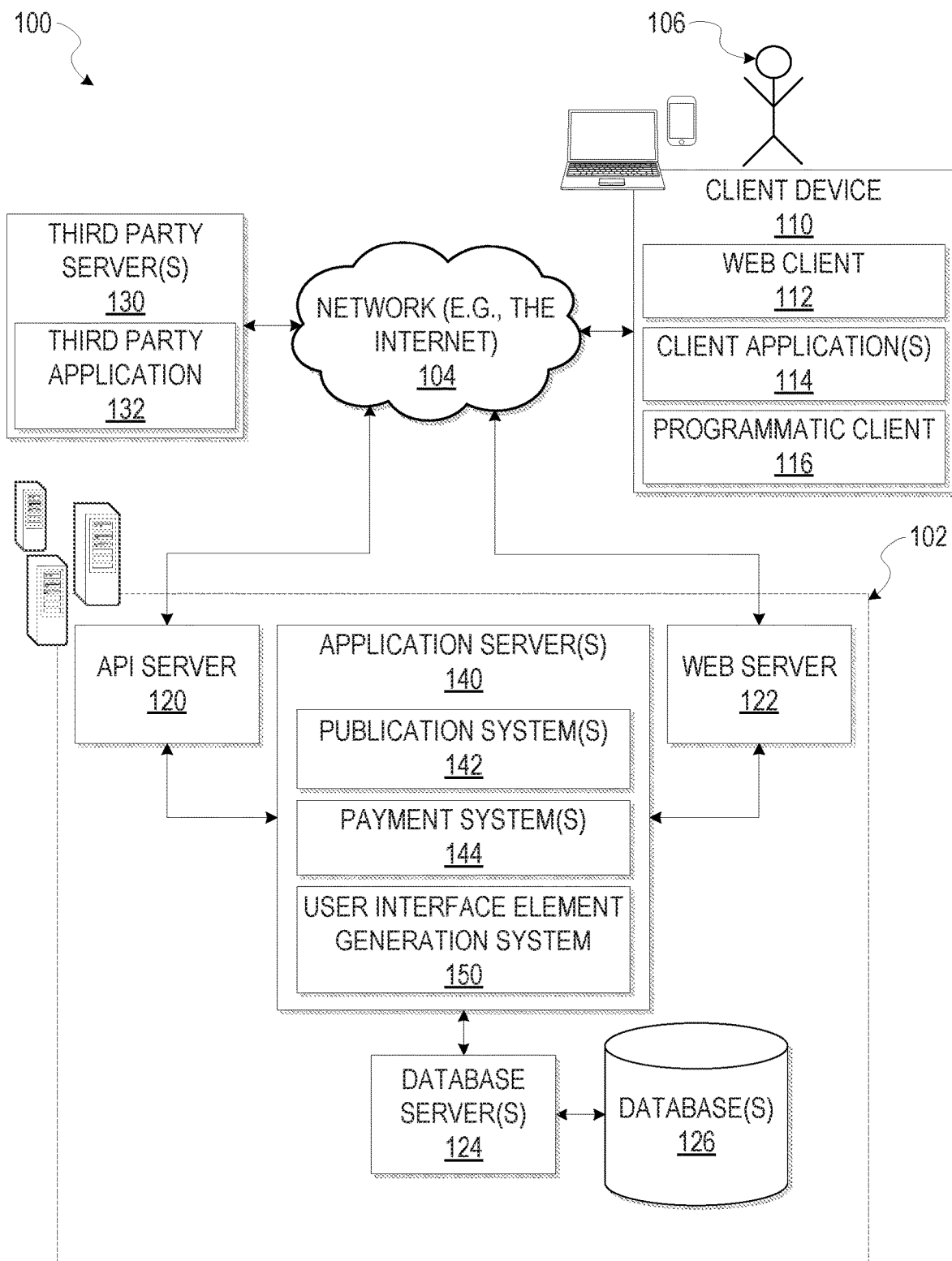
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

In various example embodiments, systems and methods for dynamically generating a set of user interface elements are presented. For example, within an auction website format, the set of user interface elements may be dynamically generated based on an item listing and profile data of a user interacting with the item listing. The set of user interface elements may be presented on the item listing when displayed to the user, without having been preconfigured or generated prior to retrieving and loading of the website displaying the item listing. The set of user interface elements can provide a simple way for users to bid on items with varying degrees of certainty that they will win the item.

A number and style of the set of user interface elements may be determined and generated based on the profile data, the item listing, and a client device on which they are displayed, among other inputs, in order to promote ease of use and presentation of values associated with the user interface elements. Each of the user interface elements can be associated with a different value to provide the user with differing bidding options and to help develop a bidding strategy for the item. The dynamic generation of the user interface elements enable each user to see differing user interface elements (e.g., differing in style, number, etc.) to create a bidding experience tailored to the user, the user's experience level, and the item on which the user is bidding.

The values can be dynamically generated based on the item listing (e.g., historical information for the item listing such as bids, number of bidders, etc.), profile data (e.g., experience of the user, number of auctions won, displayed interest in the item or category, etc.), and other item listings determined to be similar to the item listing at issue (e.g., used to determine a trending price for the item or similar items). For example, in determining values, the system and methods can take into consideration popularity (e.g., hotness, trendiness, etc.) of an item, time to end of auction, and the user's past experience with bidding on that item. For instance, if a user was previously outbid on multiple occasions, one of the user interface elements may have an associated value that is increased more than normal to increase the odds of winning for that user.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but is not limited to, a mobile phone, desktop computer, laptop, portable digital assistant (PDA), smart phone, tablet, ultra book, netbook, multi-processor system, microprocessor-based or programmable consumer electronics, game console, set-top box (STB), or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

One or more portions of network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

A user interface element generation system 150 may provide functionality operable to generate and place user interface elements within an item listing of the network-based publication system 142 and associate a dynamically determined value with each of the user interface elements. For example, the interface element generation system 150 may access the user selected data, profile data, and item listing data from the databases 126, the third party servers 130, the publication system 142, and other sources. In some example embodiments, the interface element generation system 150 may analyze the profile data and item listing data to dynamically generate the user interface elements. As the item listing and profile data change, the interface element generation system 150 can further refine the user interface elements. In some example embodiments, the interface element generation system 150 may communicate with the publication system 142 (e.g., accessing item listings) and payment system 144. In an alternative embodiment, the interface element generation system 150 may be a part of the publication system 142.

Further, while the client-server-based network architecture 100 shown in FIG. 1 employs a client-server architecture, other implementations can use alternate or additional architectures, such as a distributed architecture system, a peer-to-peer architecture system, etc. The publication system 142, payment system 144, and interface element generation system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
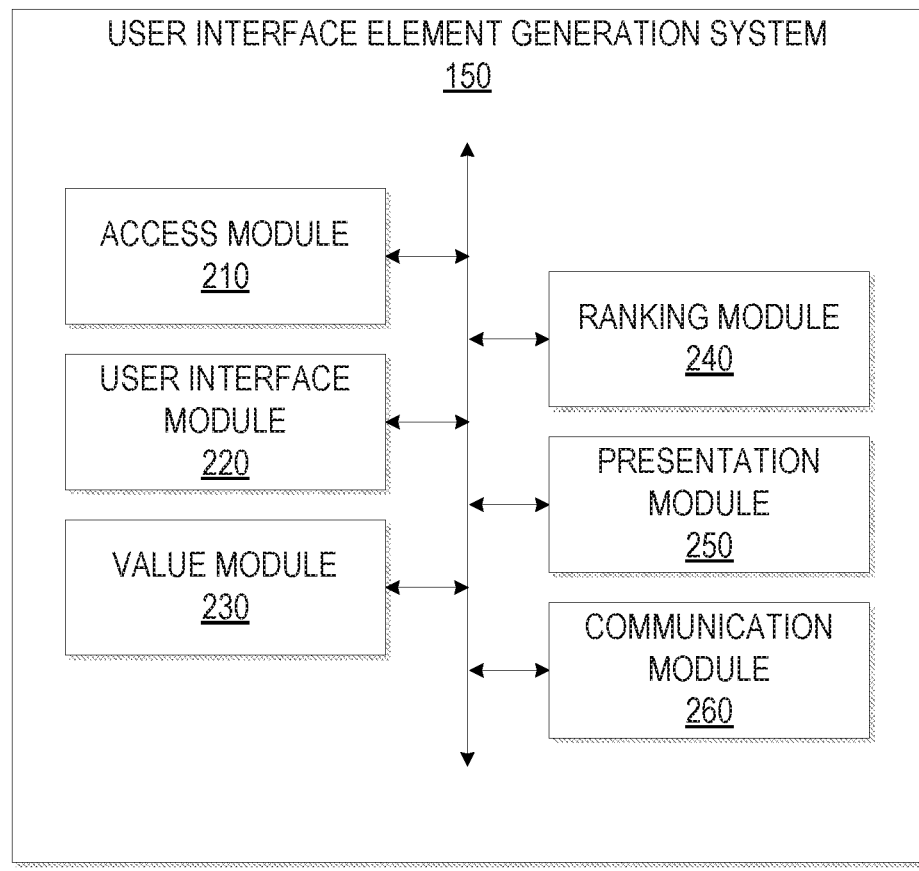
FIG. 2 is a block diagram illustrating components of a user interface element generation system suitable for dynamically generating and assigning value to user interface elements.

FIG. 2 is a block diagram illustrating components of the interface element generation system 150, according to some example embodiments. The interface element generation system 150 is shown as including an access module 210, a user interface module 220, a value module 230, a ranking module 240, a presentation module 250, and a communication module 260, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform of the operations for which that module is designed. Moreover, any two or more of these modules may be combined into a single module, and the functions described herein for a single module may be subdivided among multiple modules. Furthermore, according to various example embodiments, modules described herein as being implemented within a single machine, database 126, or device may be distributed across multiple machines, databases 126, or devices.

The access module 210 is a module configured to access, receive, or otherwise obtain data from one or more systems, databases, or components associated with or in communication with the network-based publication system 142. For example, the access module 210 may be in communication with the client device 110, the third party server 130, the database server 124, the database 126, and other systems containing information useable in dynamically generating user interface elements. In some embodiments, the access module 210 may transmit and receive data through the communication module 260.

The access module 210 may access item listing information, profile data of the user 106 interacting with the item listing, and a set of other item listings which may have been determined to be similar to the item listing with which the user 106 is interacting. Some or all of the information accessed by the access module 210 representative of the item listing, the profile of the user 106, and the set of other item listings may be stored on or accessible to the network-based publication system 142. For example, at least a portion of the item listing data, the data representative of the profile of the user 106, data representative of interactions of the user 106, and the set of other item listings may be stored within the database 126 and accessible through the database server 124. The access module 210 may also receive the item listing and profile data transmitted to the access module 210 upon the user initially interacting with the item listing.

The user interface module 220 dynamically generates a set of user interface elements to be displayed within the item listing based on the item listing data and the profile data, or a subset of the item listing data and a subset of the profile data, accessed by the access module 210. In some embodiments, the user interface module 220 can receive item listing data and the profile data from the access module 210 via the communication module 260. The user interface module 220 can perform one or more processes on the item data and the profile data, described in more detail below, to determine relevant data from the item listing data and the profile data as well as weights and ranks for the relevant data, so as to generate the set of user interface elements based on the item listing and the profile data of the user 106 accessing the item listing.

In generating the set of user interface elements, the user interface module 220 determines the number of user interface elements to generate and one or more operative aspects of the set of user interface elements, such that each user interface element is configured to perform an action on the item listing. For example, the user interface module 220 determines whether to generate two, three, four, or more user interface elements and the actions (e.g., operative aspects) that the user interface elements will perform. In some embodiments, the set of user interface elements include or are associated with logic and processes to cause a bid to be placed on the item listing upon selection of the user interface element by the user 106. In determining the number of user interface elements, the user interface module can consider one or more factors indicative of the current state of the auction, the competitiveness of the auction, the user's interest in the item or auction, and the user's familiarity or experience in bidding.

The value module 230 dynamically determines a set of values associated with the set of user interface elements. The dynamic determination of the set of values is based on the item listing and the profile data of the user 106 accessing the item listing, or a subset of the item listing data and the profile data. In some embodiments, the value module 230 performs the dynamic determination of the set of values based on the item listing, the profile data, and the number of user interface elements generated by the user interface module 220. The value module 230 can cooperate with a pricing engine (e.g., a machine learning model, described in greater detail below) to dynamically determine the values. Each value of the set of values may be associated with a user interface element of the set of user interface elements by the value module 230. In some embodiments, the set of values is associated with a user interface element of the set of user interface elements by the user interface module 220 after the value module 230 transmits the set of values to the user interface module 220.

The ranking module 240 performs ranking operations on the subset of the item listing data and the subset of the profile data. For example, the ranking module 240 may rank a set of listing factors (e.g., a subset of the item listing data) included in the item listing and a set of profile factors (e.g., a subset of the profile data) contained in the profile data of the user 106 accessing the item listing. The ranking module 240 may determine whether one or more factors of the set of listing factors and the set of profile factors exceed a predetermined threshold. In some instances, where the one or more factors exceed the predetermined threshold, the ranking module 240 passes the one or more factors to the user interface module 220 and the value module 230 for use in dynamically generating the set of user interface elements and the set of values, respectively.

The presentation module 250 causes presentation of the set of user interface elements and the set of values within the item listing. For example, the presentation module 250 can generate the set of user interface elements and the item listing, in addition to screens, web pages, or the like. The presentation module 250 can then cause presentation of the set of user interface elements and the item listing on the user interface of the client device 110. In some embodiments, the presentation module 250 can cause presentation of the set of user interface elements within the item listing by transmitting data indicative of the item listing and the set of user interface elements to the client device 110. In some instances, a portion of the presentation module 250 can be implemented by the client device 110 (e.g., a portion of an application running on the client device 110) to cause presentation of the set of user interface elements within the item listing on the user interface. The presentation module 250 can be a hardware implemented module, a software implemented module, or a combination thereof, as described in more detail below.

The communication module 260 enables communication between the client device 110, the interface element generation system 150, the publication system 142, and one or more external systems (e.g., a social media site, another publication system). In some example embodiments, the communication module 260 can enable communication among the access module 210, the user interface module 220, the value module 230, the ranking module 240, and the presentation module 250. The communication module 260 can be a hardware implemented module, a software implemented module, or a combination thereof, as described in more detail below. For example, the communication module 260 can include communication mechanisms such as an antenna, a transmitter, one or more busses, and other suitable communication mechanisms capable of enabling communication between the modules 210-250, the client device 110, the interface element generation system 150, and the publication system 142.

Figure 3:
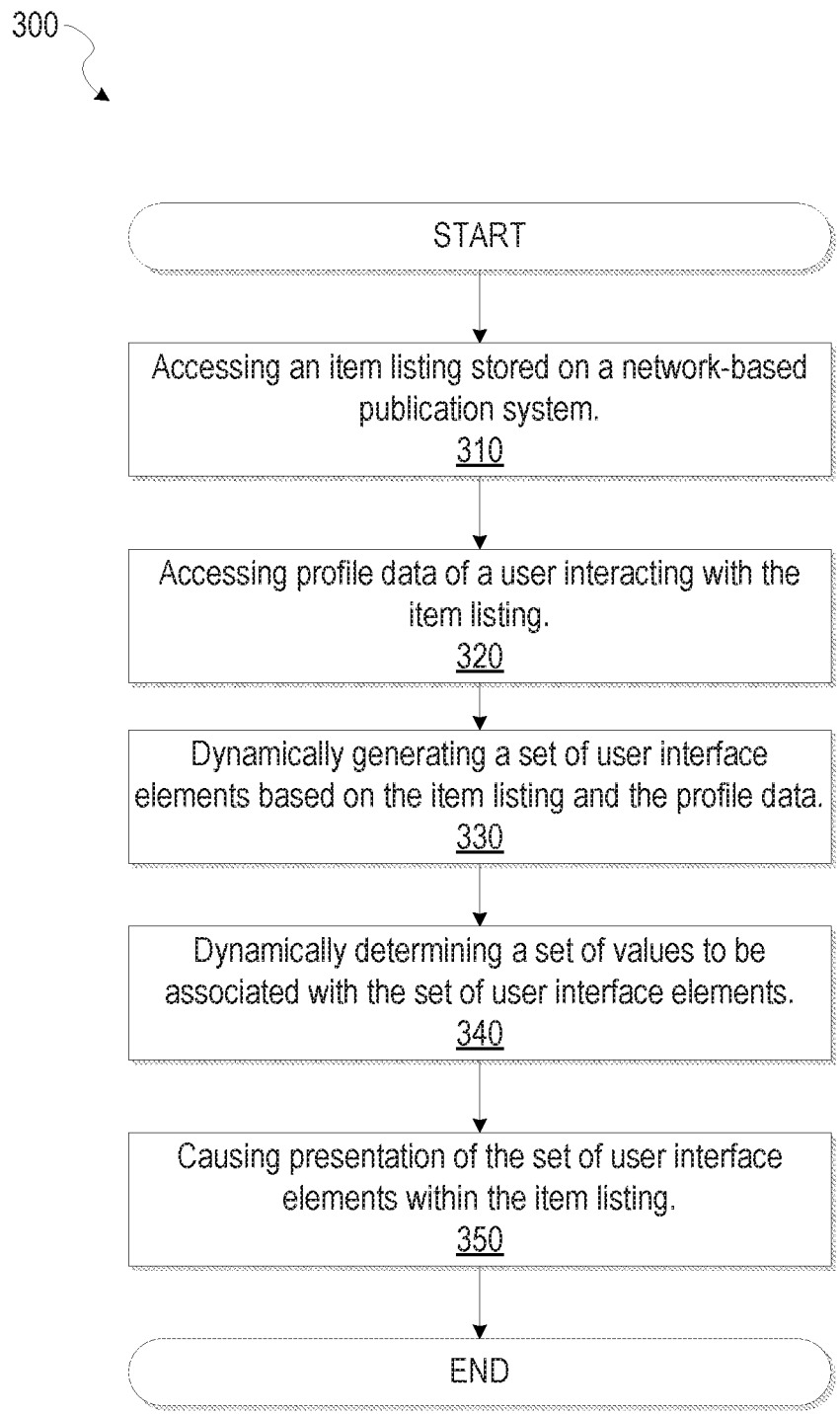
FIG. 3 is a flow diagram illustrating operations of a method for generating and assigning value to user interface elements using the hardware modules of the user interface element generation system of FIG. 2, according to some example embodiments.

With respect to FIG. 3, a flow chart of operations of the interface element generation system 150 in performing a method 300 of generating user interface elements is shown, according to some example embodiments. Operations in the method 300 may be performed by the interface element generation system 150, using modules described above with respect to FIG. 2. In some embodiments, the operations of the method 300 can be performed using the modules of FIG. 2, where portions of the modules may be implemented on client devices such as the client device 110.

In operation 310, the access module 210 accesses an item listing stored on the network-based publication system 142. The item listing may be stored on the database 126 and accessed through the one or more database servers 124. In some embodiments, the database 126 may contain a plurality of item listings including sets of item listings determined to be similar to one another. The item listings can comprise listings of products available on the network-based publication system 142. The item listings can include digital item information corresponding to the item depicted by the item listing, such as identifying characteristics of the item, quality information, quantity information, condition, and other item information. Each item listing can include a set of listing factors which may be understood as metadata of an item listing indicative of a state, status, or history of the item listing. For example, listing factors can include a current bid for the item, a minimum bid increment, a trending price, a time remaining for the item listing, a number of active bidders, a number of watchers, a number of bids within a predetermined time period, a distance between the starting bid and the current bid, a number of bids, and a number of items ending soon which have been determined to be similar.

In some embodiments, the item listings can include user interface elements to be displayed within the item listing and configured to cause one or more actions upon the item listing. For example, the user interface elements can be configured to add an item listing to a watch list, place a bid on the item listing, submit an offer for the item listing, transmit a question to a user associated with the item listing, and perform other functions on or related to the item listing.

In operation 320, the access module 210 accesses or otherwise receives profile data of the user 106 interacting with the item listing on the network-based publication system 142. The profile data of the user 106 may be representative of a user profile for the user 106. The user profile can be understood to be an aggregation of data representative of an identity of the user 106 and interactions of the user 106 on the network-based publication system 142. In some embodiments, the access module 210 can access a set of profile data of a set of users, including the user 106 or additional users of the set of users interacting with the item listing. Profile data of the user 106 and the set of users of the network-based publication system 142 can be stored on the database 126. In some embodiments, the access module 210 accesses the profile data by accessing the database 126, receiving the profile data in response to a request, or any suitable manner.

The profile data for each user contains a set of profile factors indicative of user characteristics of the user. A profile factor can be understood as a portion of data representing a feature, quality, or identifying information associated with the user. For example, the profile factors can include a number of times a user has been outbid, a number of times the user has been outbid for a particular item, a number of items on a watchlist, data indicative of items included in the watchlist, data indicative of similarities between items on the watchlist, a number of bids the user has placed within a predetermined time period, number of bids by a user for a particular item, a number of bids by the user on items determined to be similar, a number of bids the user has placed on items in a category within a predetermined time period, a number of items in a category on which the user has placed a bid within a predetermined time period, a number of page views or updates performed by the user on a particular item listing, a number of item listings on which the user has placed a winning bid, a number of item listings within a category on which the user has placed a winning bid, a percentage of item listings, within a category or regardless of category, on which the user has placed the winning bid, and other suitable profile factors indicative of item interest, category interest, preferences, and experience of the user.

In some embodiments, the set of listing factors and the set of profile factors may be partitioned into groups of signals for input into the method 300. For example, the set of listing factors and the set of profile factors can be divided into four groups of signals divided with respect to an aspect of each of the factors. In some instances, the four groups can include a current state of the item listing, a competitiveness of the item listing, a user's interest in the item listing, and a user's familiarity or experience in bidding (e.g., using the network-based publication system 140). In some embodiments, the factors (e.g., factors of the set of listing factors and the set of profile factors) in one or more of the groups of signals may present conflicting or contradictory signals for the method 300. For example, factors within the group of the user's familiarity or experience in bidding may suggest higher values (e.g., representing a more likely win of the item listing) associated with user interface elements while factors within the group of the competitiveness of the item listing may suggest lower values (e.g., representative of an item listing which is not particularly competitive) associated with the user interface elements.

In these instances, the interface element generation system 150 may prioritize one or more factors of the groups of signals or one or more groups of the groups of signals to address the conflict or contradiction. For example, in some embodiments, the interface element generation system 150 may employ machine learning techniques to experientially determine one or more of the factors which tends to have a greater effect on a positive outcome of the item listing (e.g., winning bid) and weight or prioritize those one or more factors. In some instances, the interface element generation system 150 may prioritize factors relating to the group of the user's familiarity and experience in bidding, to assist the user in familiarization with the network-based publication system 140, the process of interacting with item listings, and of winning item listings. In some embodiments, the interface element generation system 150 may disregard input from one or more factors where other factors are present or indicate a predetermined status (e.g., factors indicating user inexperience).

In operation 330, the user interface module 220 dynamically generates a set of user interface elements based on the item listing and the profile data. The user interface elements are to be displayed within the item listing. Each user interface element is configured to perform an action on the item listing. For example, the action each user interface element is configured to perform is placing a bid on the item listing and a value associated with each user interface element is a bid value. In some instances, the user interface module 220 dynamically determines a number of user interface elements for inclusion in the set of user interface elements based on the item listing. In determining the number of user interface elements and generating the set of user interface elements, the user interface module 220 also determines a display configuration for the set of user interface elements.

In some instances, the user interface module 220 can determine the number of the set of user interface elements based on one or more of the client device 110, a default user interface option, the set of profile factors, and the set of listing factors. For example, as will be explained in more detail below, the client device 110 may have one or more device characteristics representative of a display associated with the client device 110. The user interface module 220 can determine the number of user interface elements based on a size of the display for the client device 110, a resolution of the display, a size of the font, or other aspects relating to the client device 110.

When determining the number of user interface elements based on a default user interface option, the interface module 220 can determine an existence of one or more default user interface options. In some cases, the interface module 220 can also determine one or more use cases for the one or more default user interface options. For example, the interface module 220 can determine the existence of a maximum user interface element threshold (e.g., no more than two user interface elements) and generate a number of user interface elements equal to or less than the maximum user interface element threshold (e.g., two user interface elements). For example, as will be discussed in more detail below, where limited to two user interface elements, the interface module 220 can include a first user interface element representative of a value equal to a minimum bidding increment and a second user interface element representative of a value determined likely to result in a successful final bid for the item listing. By way of example, in some embodiments, the interface module 220 can determine the first user interface element as the minimum bid increment added to the current bid, the second user interface element as a first multiple of the minimum bid increment added to the value of the first user interface element, and the third user interface element as a second multiple of the minimum bid increment added to the value of the first user interface element or the second user interface element.

In some embodiments, in determining the display configuration, the user interface module 220 can determine one or more of a size, a shape, an offset distance between two or more of the set of user interface elements, a position of the set of user interface elements, and other display characteristics. For example, the user interface module 220 can determine a display configuration for the set of user interface elements including a size of the user interface elements and a spacing of the user interface elements where the set of user interface elements includes two user interface elements. Where the set of user interface elements includes three or more user interface elements, the user interface module 220 can determine a display configuration for the set of user interface elements differing in size, shape, spacing, and other display characteristics than previously determined for the set of user interface elements containing a different number of user interface elements.

In some instances, the user interface module 220 determines the display configuration based on the number of user interface elements included in the set of user interface elements and one or more device characteristics of the client device 110. The one or more device characteristic can include a screen size, a screen resolution, a user interface type (e.g., a web browser, an application interface), data indicative of a predetermined operating system, a bandwidth constraint, a data limit constraint, or other suitable characteristics or constraints associated with the client device 110. In some instances, the display configuration is determined to provide a predetermined aspect ratio to the user interface elements, to occupy no more than a predetermined area of an available screen of the client device 110, to occupy no more than a predetermined percentage of an available screen of the client device 110, to provide the user interface elements in a size and shape configured such that each of the user interface elements can appear in a single row without overlap of each other, or other information included within the item listing.

Once the user interface module 220 determines the number of user interface elements included in the set of user interface elements, the user interface module 220 can receive an input indicative of the one or more device characteristics of the client device 110. The user interface module 220 includes the one or more device characteristics in the determination of the display characteristics. By way of example, the user interface module 220 can initially determine the display configuration as including a first size, a first shape, and a first spacing for the set of user interface elements and modify the first size, the first shape, and the first spacing to a second size, a second shape, and a second spacing, respectively, based on the one or more device characteristics. In some instances, the one or more device characteristics are initially included in the input for determining the display configuration.

In operation 340, the value module 230 dynamically determines a set of values associated with the set of user interface elements. After determination of the set of values, the value module 230 associates the set of values with the set of user interface elements such that each value of the set of values is associated with a user interface element of the set of user interface elements. In at least some embodiments, the association of the set of values and the set of user interface elements is a one to one association, where once a value of the set of values has been associated to a user interface element, it is not associated with another user interface element of the set of user interface elements. Once associated with a user interface element, a value may represent a monetary value to be bid on the item listing upon selection of the associated user interface element. In some embodiments, the set of values may be based, at least in part, on the item listing and the profile data. The set of values may also be based, at least in part, on the number of user interface elements included in the set of user interface elements. For example, where the set of user interface elements contain only two elements, a difference between the set of values may be higher than where the set of user interface elements contain three elements. By way of further example, where the profile data indicates the user is inexperienced at using the network-based publication system 140 and the set of user interface elements includes two elements, the value for the second user element may be higher than that generated for an experienced user in order to assist the inexperienced user in winning the item listing.

In some instances, the set of values can include a first value and a second value. The first value may represent a minimum bid having a minimum increment suitable to replace a current high bid for the item listing. The second value may represent a suggested bid having a bid increment greater than the minimum bid increment. In some embodiments, the second value may be determined likely to result in a successful final bid for the item listing, as will be explained in more detail below.

In another example, the user interface module 220 may generate three user interface elements with a first user interface element, a second user interface element, and a third user interface element. The first user interface element may represent a minimum successful bid (e.g., a current bid plus a minimum bid increment). The third user interface element may represent a high bid, above the minimum successful bid and determined to be a value high enough act as a winning bid based on one or more of the listing factors such as the current bid, a pace of bidding, the number of bidders, and other suitable item listing information. In some embodiments, the third user interaction element may be associated with a trending price of the item listing or other item listings determined to be similar, based on bids for the other item listings within a period of time prior to the generation of the user interface elements. The second user interface element may represent a medium bid between the values for the first user interface element and the third user interface element, such as a bid between the minimum bid and the high bid determined to have a possibility of becoming the winning bid. Further, in some instances, one or more of the user interface elements may be associated with a value representing a suggested amount for a best price offer, determined to be comparable to the winning bid for items determined to be similar to the item listing. The suggested amount can take into account differences between the similar items and the item listing such as differences in condition, quantity, age, or other factors which may affect a value of an item listed on the network-based publication system 142.

As an example scenario, where the network-based publication system 142 includes item listings in auctions, the interface element generation system 150 may receive listing data indicating that a current bid for the item listing can be $90, a minimum bid increment of $5, a trending price of $200, and one minute left on the auction for the item listing. The interface element generation system 150 may further receive data indicating that a number of bidders for this item listing is higher than average, a number of users watching this item is higher than average, and a number of times that the user for whom the set of interface elements are being generated has been outbid ten times. The interface element generation system 150 may also receive profile data indicating that the user has a higher than average number of bids on similar items and has a low familiarity with the network-based publication system 142. The interface module 220 may generate a first user interface element and a second user interface element. The first user interface element may be associated with a bid of $95, representing the current bid in addition to the minimum bid increment. The second user interface element may be associated with a bid of $200, representing the trending price of the item and a higher likelihood that the user may win the item listing. In this example scenario, the interface element generation system 150 generated first and second user interface elements to simplify the bidding process for the inexperienced user and established a value for the second user interface element at the trending price to increase simplicity for the user and increase the likelihood of a winning bid without further interaction.

In a similar scenario, where the user is experienced, the time remaining on the auction is greater, and the number of bidders and watchers of the auction is lower than average, the interface element generation system 150 may generate first, second, and third user interface elements having values of $95, $110, and $125, respectively. The generation of the first, second, and third user interface elements, and the relatively lower value of the second and third user interface elements (as compared to the example scenario discussed above) may represent a more complex bidding process with a lower likelihood of winning the item listing without additional user interaction. In this example scenario, the interface element generation system 150 may determine that the user has greater time and a better understanding of the bidding process and, as such, is better able to quickly fine tune subsequent bids at the close of the auction in order to win the item listing while retaining lower bids than an inexperienced user.

In operation 350, the presentation module 250 causes presentation of the set of user interface elements within the item listing. In at least some embodiments, the presentation module 250 causes presentation of the values associated with each of the user interface elements presented within the item listing.

In some instances, once the set of user interface elements is selected and a bid applied to the item listing, the network-based publication system 142 can perform dynamic proxy bidding up to the value of the selected user interface element and bid. Further, based on selection of the user interface element, the network-based publication system 142 may dynamically transmit reminders or notifications to the client device 110. For example, the network-based publication system 142 can transmit notifications of proxy bidding, current price of the item listing, a bid status of the bid associated with the selected user interface element, an auction status, an outbid indicator, or other notifications relating to the item listing. In some embodiments, the notifications can include dynamic pricing suggestions indicative of changes in the item listing (e.g., bidding history, additional bidders, and additional similar items being offered). The dynamic pricing suggestions can be generated similarly to the value of the user interface elements, and once selected, cause a change to a bid of the user 106 to reflect a dynamic pricing suggestion of the notification.

Figure 4:
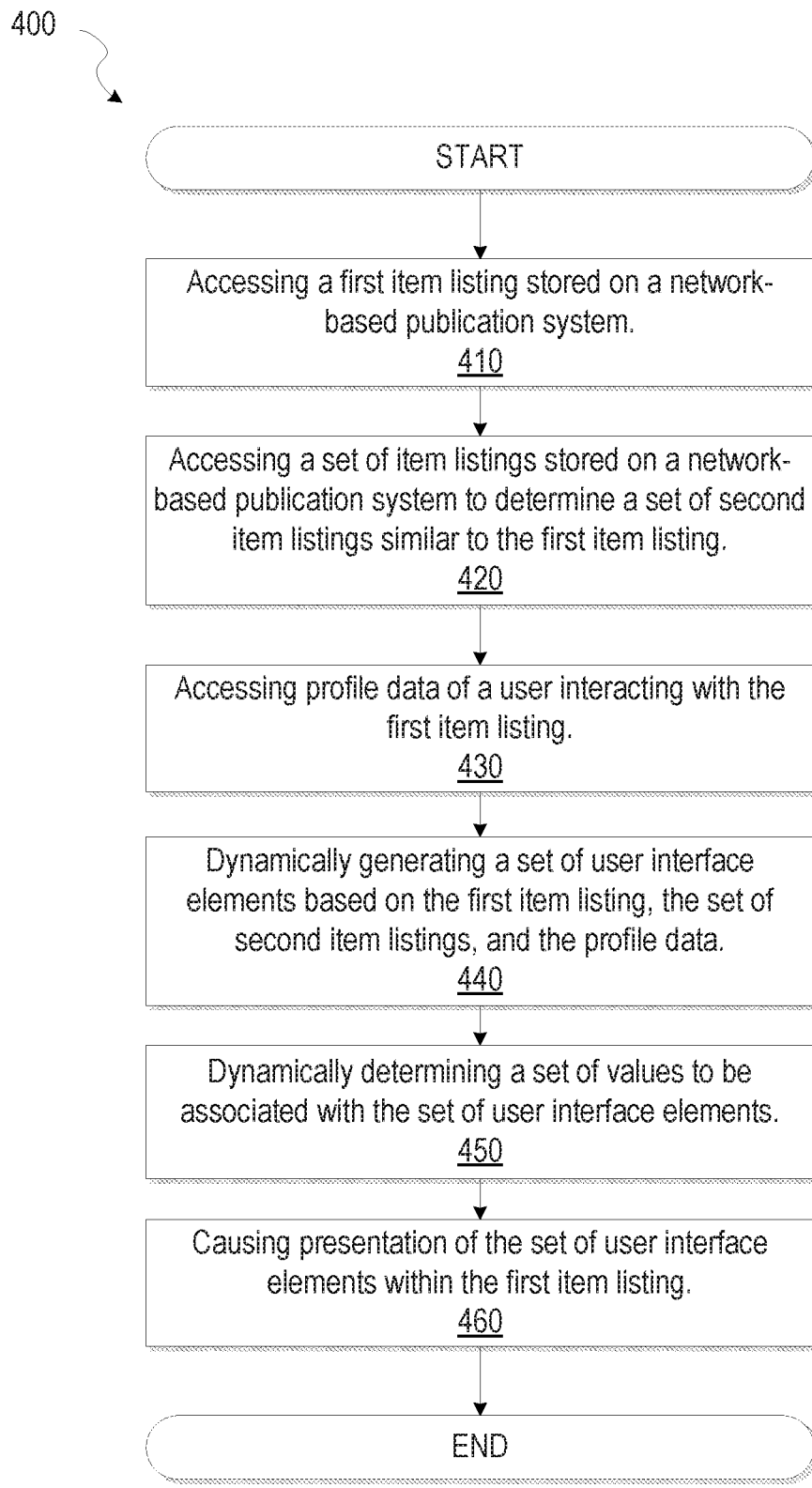
FIG. 4 is a flow diagram illustrating operations of a method for generating and assigning value to user interface elements using the hardware modules of the user interface element generation system of FIG. 2, according to some example embodiments.

FIG. 4 shows a flow chart of operations of the interface element generation system 150 in performing a method 400 of generating user interface elements is shown, according to some example embodiments. Operations in the method 400 may be performed by the interface element generation system 150, using modules described above with respect to FIG. 2. In some embodiments, the operations of the method 400 can be performed using the modules of FIG. 2, where portions of the modules may be implemented on client devices such as the client device 110.

In operation 410, the access module 210 accesses a first item listing stored on the network-based publication system 142. The first item listing may be stored on the database 126 and accessed through the one or more database servers 124. In some instances, operation 410 may be performed similar to or the same as operation 310, described above.

In operation 420, the access module 210 accesses a set of item listings. The access module can access the set of item listings similarly to the manner discussed with reference to operation 310. In some embodiments, the access module 210 can determine a set of second item listings, included within the set of item listings, as being similar to the first item listing. The access module 210 can determine the first item listing and the set of second item listings based on a keyword search or comparison, a category comparison (e.g., comparing item and other organization categories with which the first item listing and the set of second item listings are associated), an interrelation of the first item listing and the set of second item listings (e.g., a common merchant or vendor, an item within the set of second listings being a terminated item listing and the first item listing descended from the terminated item listing), or any other suitable manner of comparison to determine a similarity.

In operation 430, the access module 210 accesses or otherwise receives profile data of the user 106 interacting with the item listing on the network-based publication system 142. The profile data of the user 106 may be representative of a user profile for the user 106. In some embodiments, operation 430 may be performed similarly to operation 320.

In operation 440, the user interface module 220 dynamically generates a set of user interface elements based on the first item listing, the profile data, and the set of second item listings. In some instances, the user interface module 220 dynamically determines a number of user interface elements for inclusion in the set of user interface elements based on the first item listing, the profile data, and the set of second item listings.

In some embodiments, the user interface module 220 dynamically generates the set of user interface elements using one or more machine learning processes. In these embodiments, the profile data, the first item listing, and the set of second item listings, as well as the associated listing factors and profile factors, can be processed into a set of factor values for input into the machine learning processes. These factor values can be input into the machine learning processes (a part of the user interface module 220) to determine the number of user interface elements within the set of user interface elements as well as the set of values associated with the set of user interface elements.

In operation 450, the value module 230 dynamically determines a set of values associated with the set of user interface elements. Each value of the set of values may be determined based on the number of user interface elements included in the set of user interface elements, the first item listing, and the set of second item listings. In some instances, the value module 230 also takes into account the profile data in determining the set of values. After determination of the set of values, the value module 230 associates the set of values with the set of user interface elements such that each value of the set of values is associated with a user interface element of the set of user interface elements.

The set of user interface elements include selectable user interface elements which the user 106 may selecting using an action, such as a mouse click. In some embodiments, selection of a user interface element of the set of user interface elements can generate an interrupt causing the network-based publication system 142 to place a bid on the item listing. The set of user interface elements can be of various forms. For example, in some embodiments as described above, the set of user interface elements are generated as a set of discrete selectable elements such as buttons, with each user interface element associated with a value of the set of values. In some instances, the set of user interface elements can be a slider having a predetermined range representative of the set of values. The set of user interface elements may also be displayed as pre-filled amounts within one or more data entry windows. Further, the set of user interface elements can be represented by a single user interface element, such as a dial. In these embodiments, the single user interface element can include a plurality of positions indicative of the set of user interface elements and the set of values. For example, the single user interface element, displayed as a dial or scroll wheel, could include a number of positions (e.g., tick marks encompassing the dial or positions on the scroll wheel) where each of the number of positions is indicative of a user interface element of the set of user interface elements and a value of the set of values.

In operation 460, the presentation module 250 causes presentation of the set of user interface elements within the item listing. In some embodiments, operation 450 can be performed similarly or the same as operation 350. In some embodiments, the presentation module 250 can additionally cause presentation of bidding information relating to the item listing. For example, the bidding information can include a trending price of the item listing or other item listings determined to be similar, based on the set of second item listings. In some instances, the presentation module 250 causes presentation of the set of user interface elements with relative textual indications of the associated values, without providing a numerical value on the user interface elements. In these instances, the presentation module 250 can cause presentation of the value associated with a user interface element of the set of user interface elements based on a screen position of a selection icon or a touch position (e.g., when the user hovers a mouse pointer or finger over the user interface element).

Figure 5:
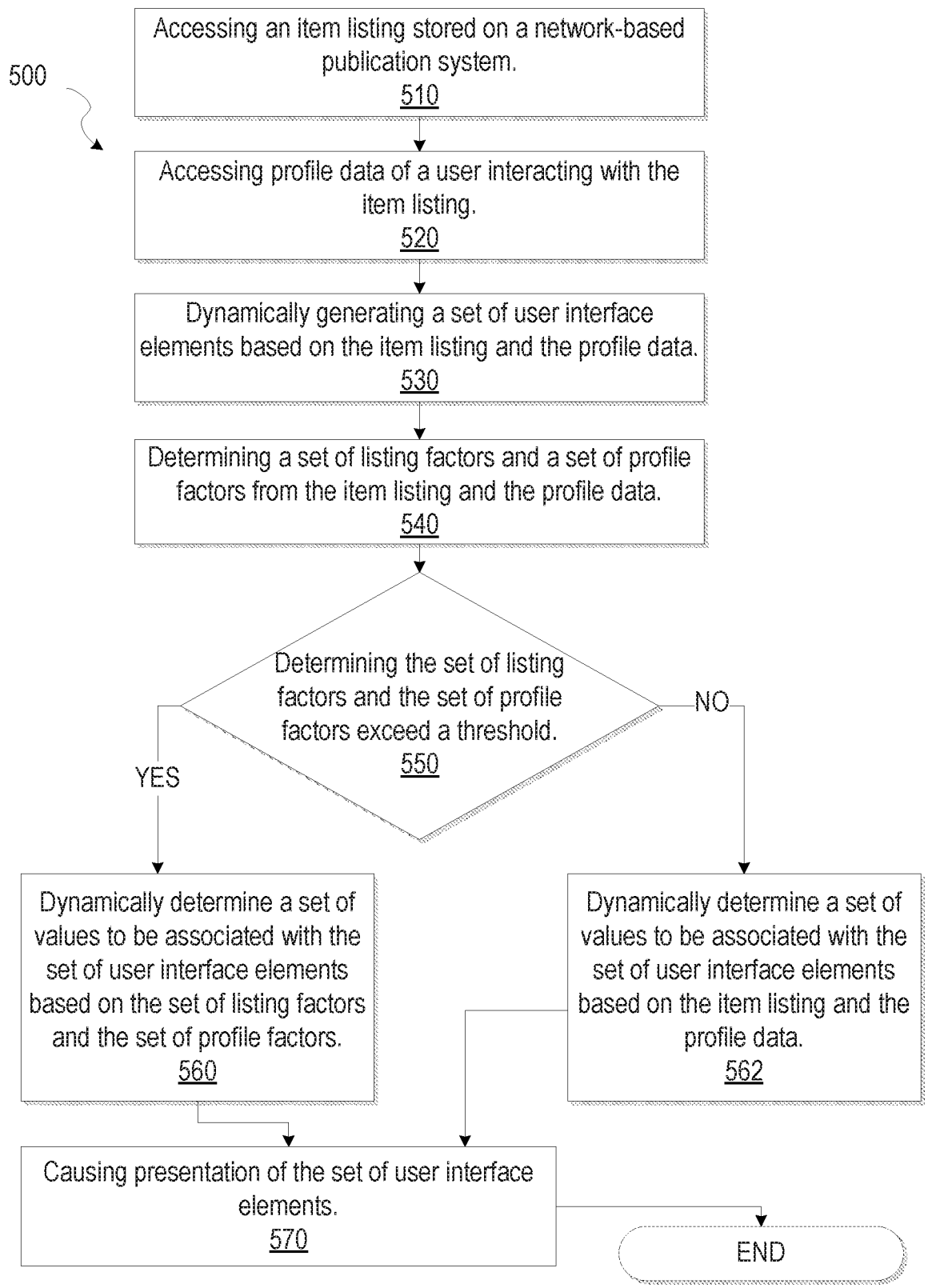
FIG. 5 is a flow diagram illustrating operations of a method for generating and assigning value to user interface elements using the hardware modules of the user interface element generation system of FIG. 2, according to some example embodiments.

FIG. 5 shows a flow chart of operations of the interface element generation system 150 in performing a method 500 of generating user interface elements is shown, according to some example embodiments. Operations in the method 500 may be performed by the interface element generation system 150, using modules described above with respect to FIG. 2. In some embodiments, the operations of the method 500 can be performed using the modules of FIG. 2, where portions of the modules may be implemented on client devices such as the client device 110.

In operation 510, the access module 210 accesses an item listing stored on the network-based publication system 142. The item listing may be stored on the database 126 and accessed through the one or more database servers 124. In some instances, operation 510 may be performed similar to or the same as operation 310 or operation 410, described above.

In operation 520, the access module 210 accesses or otherwise receives profile data of the user 106 interacting with the item listing on the network-based publication system 142. The profile data can include a user profile for the user 106. In some embodiments, the operation 520 can be performed similarly to the operation 320 or the operation 430, described above.

In operation 530, the user interface module 220 dynamically generates a set of user interface elements based on the item listing and the profile data. In some embodiments, the user interface elements may be based on one or more listing factors determined from the item listing and one or more profile factors determined from the profile data. In some embodiments, operation 530 can be performed similarly to or the same as operation 330 or operation 440.

In operation 540, ranking module 240 determines a set of listing factors from the item listing accessed by the access module 210 and a set of profile factors from the profile data accessed by the access module 210. The ranking module 240 determines a rank for the set of listing factors and a rank for the set of profile factors.

In some embodiments, the ranking module 240 includes a machine learning model. The machine learning model may be generated by testing of listing factors and profile factors from a plurality of successfully completed item listings (e.g., item listings terminated with a successful purchase) and a plurality of profile data from a plurality of users. The testing may determine relative importance of the listing factors and the profile factors with respect to their use for accurately indicating a final winning bid for an item listing and a winning bid strategy. The relative importance may be quantified into a listing factor effect rank and a profile factor effect rank, indicating an effectiveness of a given listing factor or a given profile factor respective to other listing factors or profile factors within their respective rankings. In some embodiments, the testing may include receiving user input indicative of human judgement on relative importance of factors.

Once the machine learning model has completed testing, the machine learning model can be understood to act as a pricing engine with inputs as the listing factors and profile factors. The pricing engine can be accessed and used by the ranking module 240 to compare the set of listing factors and the set of profile factors, accessed by the access module 210, with the listing factor effect rank and the profile factor effect rank to determine the rank of the set of listing factors and the rank of the set of profile factors.

In operation 550, the ranking module 240 may determine the set of listing factors exceeding a predetermined listing threshold and the set of profile factors exceeding a predetermined profile threshold. After determining one or more listing factors of the set of listing factors and one or more profile factors of the set of profile factors which exceed the listing threshold and the profile threshold, the ranking module 240 transmits the listing factors and profile factors exceeding the respective thresholds to the value module 230 for consideration in determining a set of values.

In operation 560, where the ranking module 240 determines the predetermined listing threshold exceeds the set of listing factors and the predetermined profile threshold exceeds the set of profile factors, the value module 230 may dynamically determine the set of values to be associated with the set of user interface elements using the item listing data and the profile data, as described above with reference to operations of the method 300.

In operation 562, the value module 230 dynamically determines a set of values associated with the set of user interface elements. Each value of the set of values may be determined based on the number of user interface elements included in the set of user interface elements and a set of factors. The set of factors may be the one or more listing factors and the one or more profile factors received from the ranking module 240. In some embodiments, operation 560 can be performed where the set of listing factors and the set of profile factors do not exceed the threshold and can be performed similarly to operation 340 or operation 450, described above. After determination of the set of values, the value module 230 associates the set of values with the set of user interface elements such that each value of the set of values is associated with a user interface element of the set of user interface elements.

In operation 570, the presentation module 250 causes presentation of the set of user interface elements within the item listing. In some embodiments, operation 570 can be performed similarly to or the same as operation 350 or operation 460.

Figure 6:
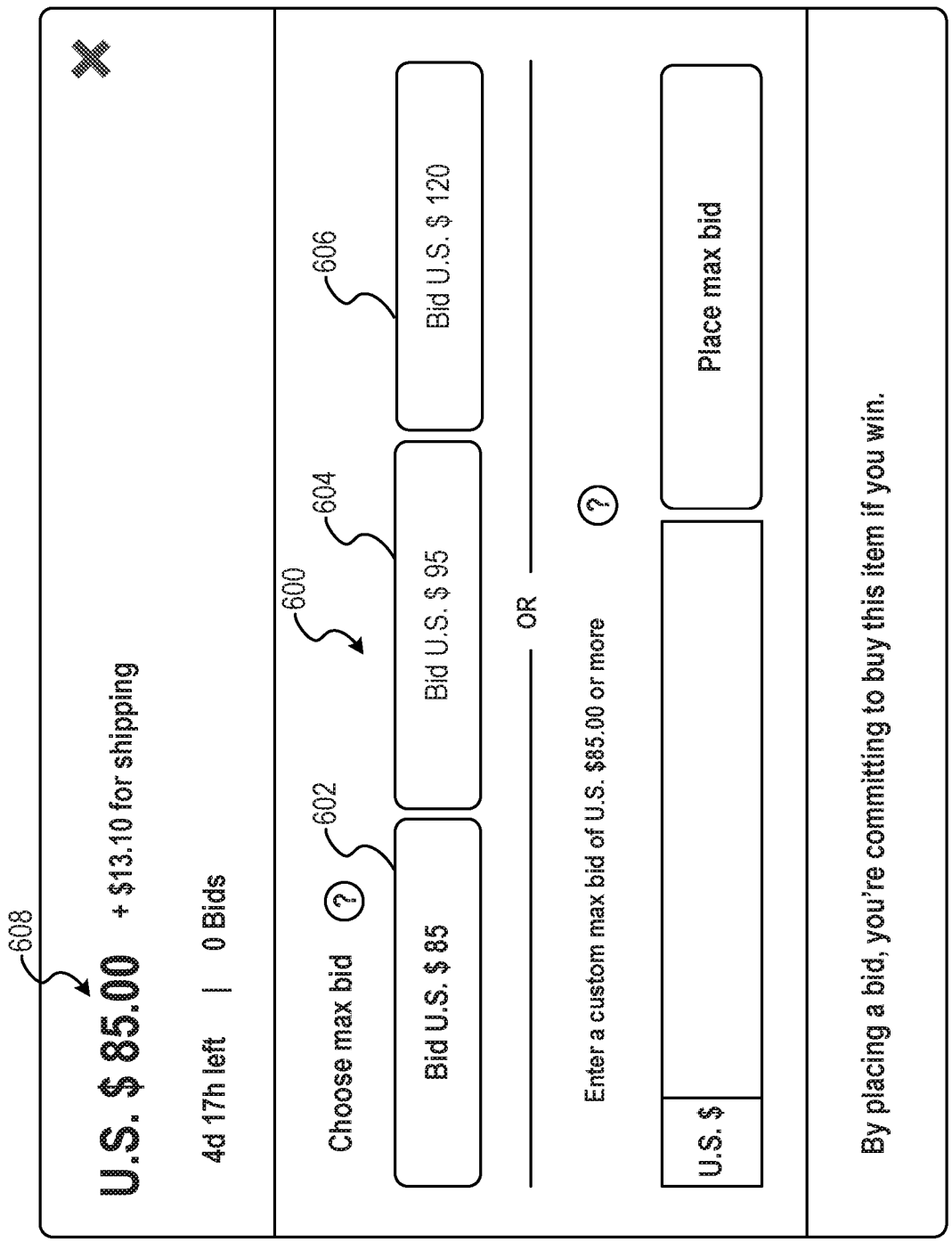
FIG. 6 is an interface diagram illustrating example dynamically generated user interface elements generated and displayed by the user interface element generation system, according to some example embodiments.

FIGS. 6-9 show an example set of user interface screens and a bidding method of using dynamically generated and presented user interface elements, for example the user interface elements generated and presented in methods 300, 400, and 500. Referring now to FIG. 6, a first set of user interface elements 600 is presented. A first user interface element 602 represents a minimum successful bid, a second user interface element 604 represents a middle bid, and a third user interface element 606 represents a high bid. As shown in FIG. 6, a current bid 608 may indicate one of the set of user interface elements. Upon selection of one of the set of user interface elements 602, the network-based publication system 142 can request an authentication from the user 106 to confirm the bid and then place the bid on the item listing.

As shown in FIG. 7, where the bid associated with the selected user interface is insufficient to overcome a currently placed proxy bid of another user, the network-based publication system 142 may cause the user interface element generation system 150 to generate a second set of user interface elements 700. The second set of user interface elements 700 can include a first user interface element 702, a second user interface element 704, and a third user interface element 706 associated with first, second, and third values for respective bids. The first, second, and third values can be determined by the value module to be above the values of the first set of user interface elements 600. As shown in FIG. 7, a current bid 708 can reflect a current high bid for the item listing, where a previous bid failed to overcome the proxy bidding of another user. The user 106 may be prompted to select one of the second user interface elements 700.

Figure 8:
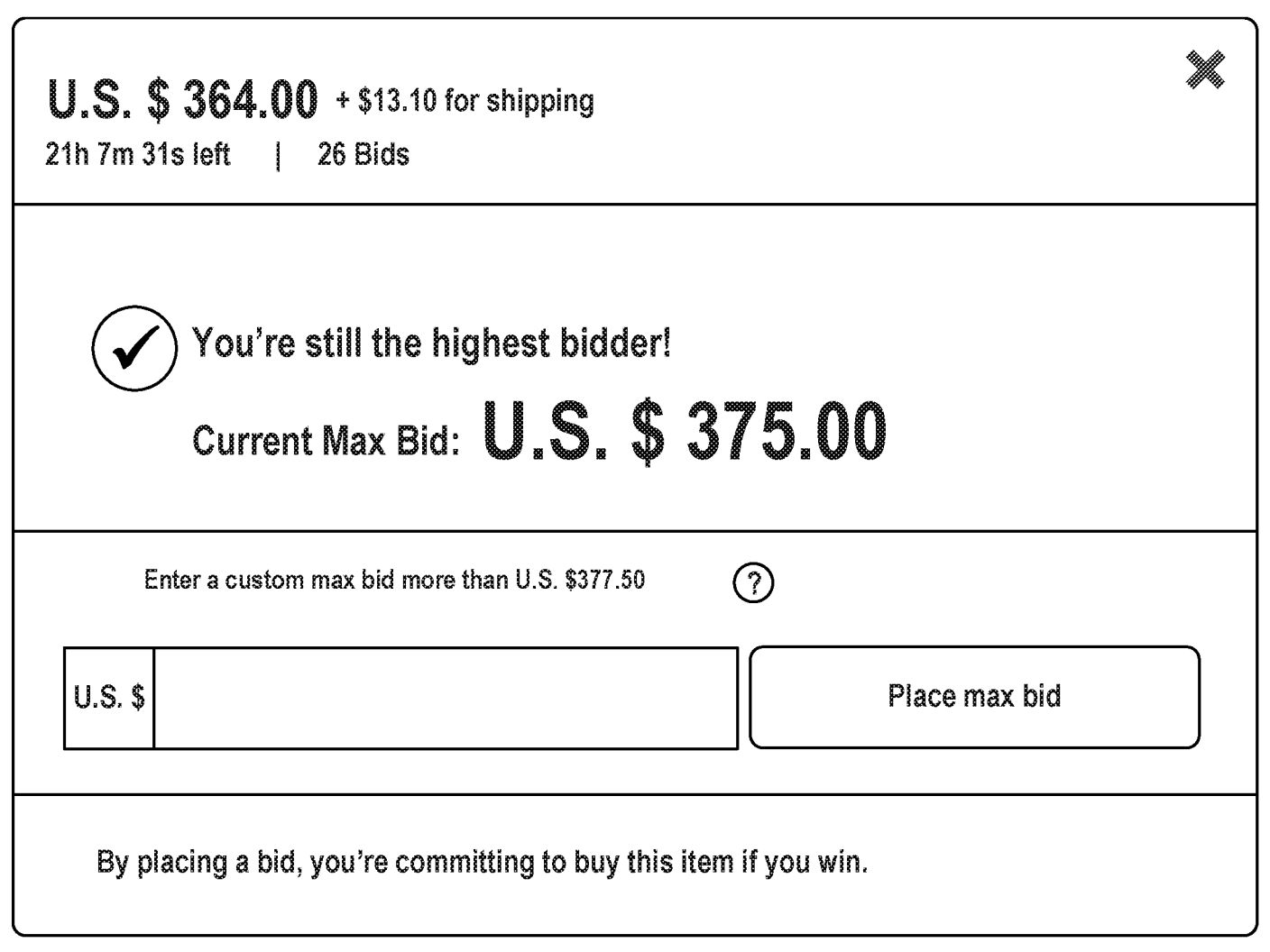

FIG. 8 depicts a high bidder notification generated upon a bid associated with a selected user interface element being placed which overcomes a current high bid for the item listing. After the high bidder notification is displayed for the user 106, the network-based publication system 142 may generate one or more subsequent proxy bidding notifications.

Figure 9:
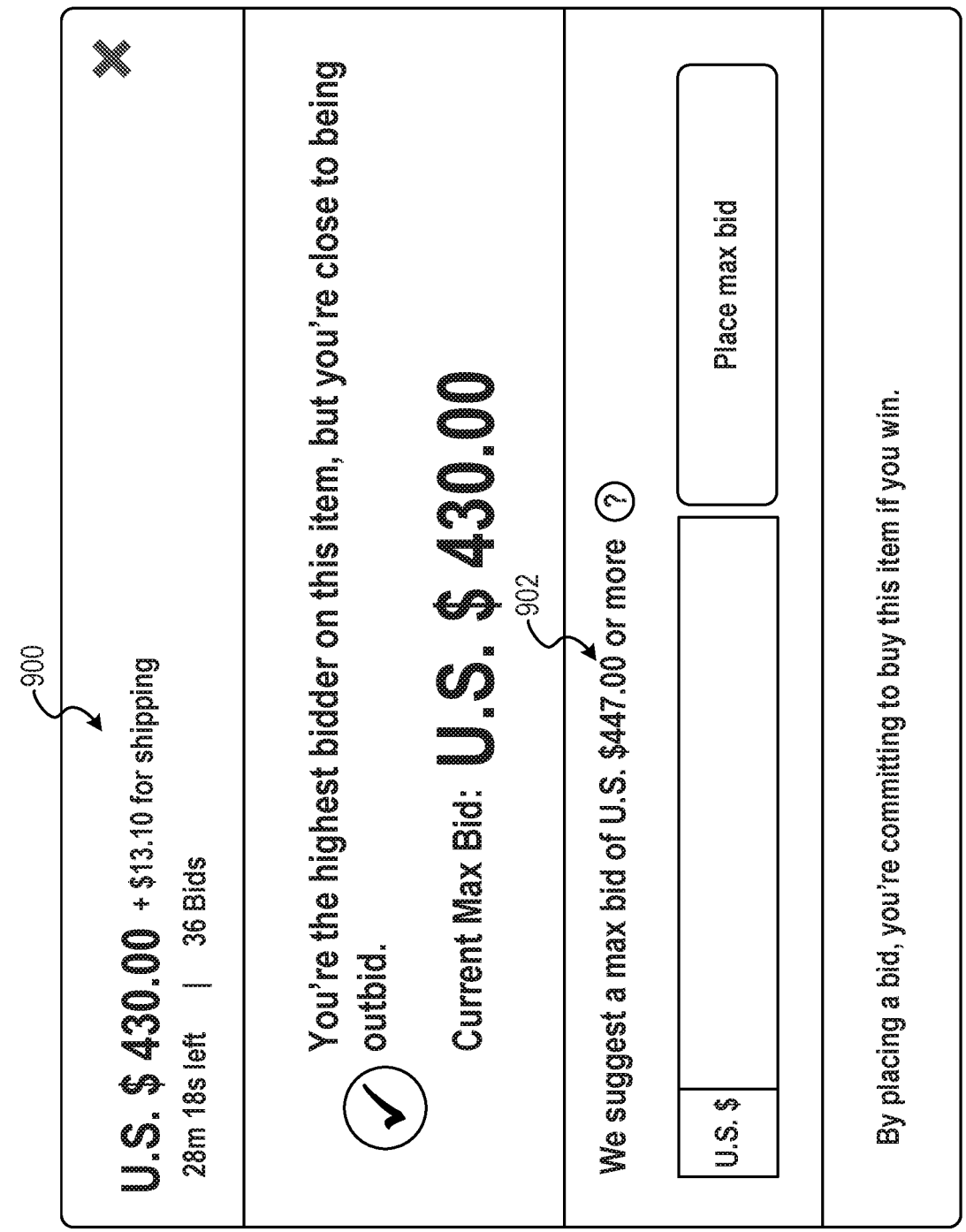
FIG. 9 is an interface diagram illustrating a suggested proxy bid notification generated by the user interface element generation system, according to some example embodiments.

For example, as shown in FIG. 9, the network-based publication system 142 may cause a proxy bid notification 900 to be displayed or transmitted to the user 106 where a bid of another user is determined to approach the bid of the user 106. In some instances, the network-based publication system 142 can issue the proxy bid notification 900 upon the bid of the user 106 reaching an upper limit of a proxy bid range. The network-based publication system 142 may also issue the proxy bid notification 900 where a bid of another user is within a predetermined threshold of a maximum bid placed by the user 106. The proxy bid notification 900 can include a suggested bid 902 comprised of a bid having a bid increment greater than the minimum bid increment added to the current high bid.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., at least one processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-9 are implemented in some embodiments in the context of at least one machine and at least one associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the concepts contained in the present disclosure in different contexts from the disclosure contained herein.

Software Architecture

Figure 10:
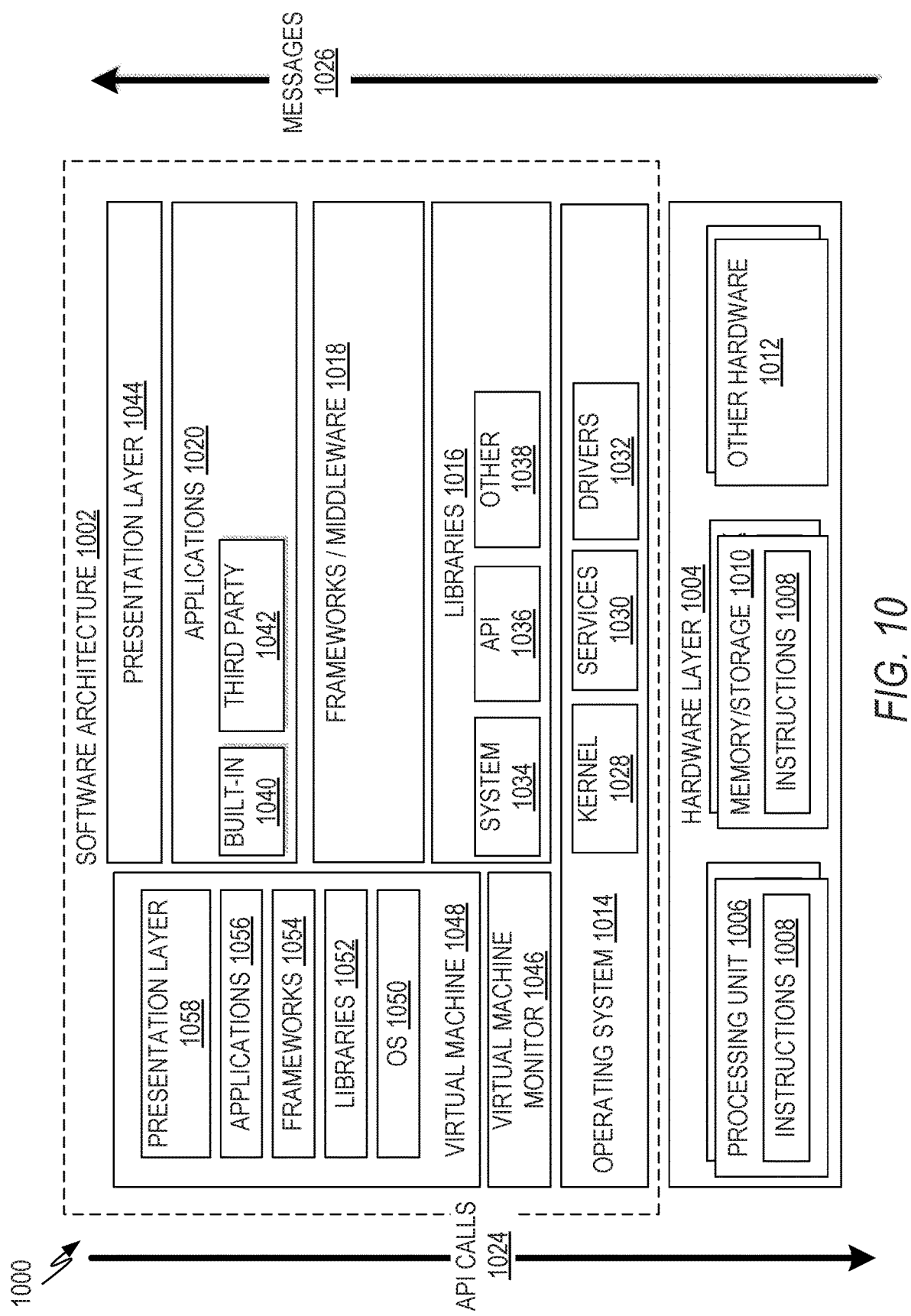
FIG. 10 is a block diagram illustrating an example of a software architecture that may be installed on a machine capable of implementing the methods and modules of the user interface element generation system, according to some example embodiments.

FIG. 10 is a block diagram 1000 illustrating a representative software architecture 1002, which may be used in conjunction with various hardware architectures herein described. FIG. 10 is merely a non-limiting example of a software architecture and it will be appreciated that many other architectures may be implemented to facilitate the functionality described herein. The software architecture 1002 may be executing on hardware such as machine 1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 comprises one or more processing units 1006 having associated executable instructions 1008. Executable instructions 1008 represent the executable instructions of the software architecture 1002, including implementation of the methods, modules, and so forth of FIGS. 1-9. Hardware layer 1004 also includes memory and/or storage modules 1010, which also have executable instructions 1008. Hardware layer 1004 may also comprise other hardware as indicated by 1012, which represents any other hardware of the hardware layer 1004, such as the other hardware illustrated as part of machine 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke API calls 1024 through the software stack and receive a response, returned values, and so forth illustrated as messages 1026 in response to the API calls 1024. The layers illustrated are representative in nature and not all software architectures have all layers. For example, some mobile or special purpose operating systems may not provide a frameworks/middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030, and/or drivers 1032). The libraries 1016 may include system 1034 libraries (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be utilized by the applications 1020 and/or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 include built-in applications 1040 and/or third party applications 1042. Examples of representative built-in applications 1040 may include, but are not limited to, a contacts application, a browser application, a book reader application, a location application, a media application, a messaging application, and/or a game application. Third party applications 1042 may include any of the built in applications as well as a broad assortment of other applications. In a specific example, the third party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1042 may invoke the API calls 1024 provided by the mobile operating system such as operating system 1014 to facilitate functionality described herein.

The applications 1020 may utilize built in operating system functions (e.g., kernel 1028, services 1030, and/or drivers 1032), libraries (e.g., system 1034, APIs 1036, and other libraries 1038), and frameworks/middleware 1018 to create user interfaces to interact with users of the system. Alternatively, or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware machine (such as the machine of FIG. 11, for example). A virtual machine is hosted by a host operating system (operating system 1014 in FIG. 10) and typically, although not always, has a virtual machine monitor 1046, which manages the operation of the virtual machine as well as the interface with the host operating system (i.e., operating system 1014). A software architecture executes within the virtual machine such as an operating system 1050, libraries 1052, frameworks/middleware 1054, applications 1056, and/or presentation layer 1058. These layers of software architecture executing within the virtual machine 1048 can be the same as corresponding layers previously described or may be different.

Example Machine Architecture and Machine-Readable Medium

Figure 11:
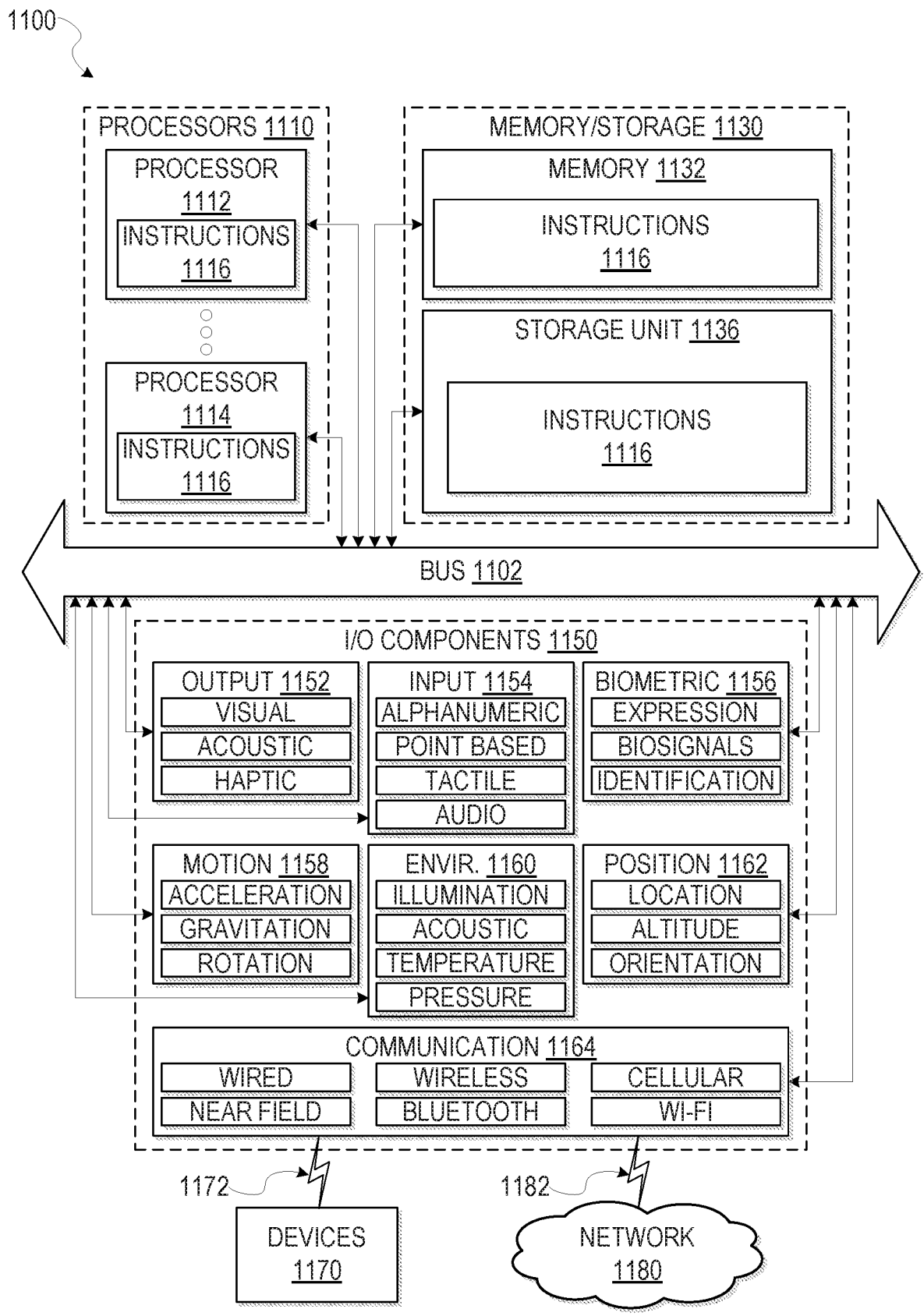
FIG. 11 illustrates a diagrammatic representation of a machine in the form of a computer system within which a set of instructions may be executed for causing the machine to perform any one or more of methods of the user interface element generation system, according to an example embodiment.

FIG. 11 is a block diagram illustrating components of a machine 1100, according to some example embodiments, able to read instructions (e.g., processor-executable instructions) from a machine-readable medium (e.g., a non-transitory machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example the instructions may cause the machine to execute the flow diagrams of FIGS. 3-5. Additionally, or alternatively, the instructions may implement access module 210, the user interface module 220, the value module 230, the ranking module 240, the presentation module 250, and the communication module 260 of FIGS. 1-5, and so forth. The instructions transform the general, non-programmed machine into a particular machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a STB, or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 1112 and processor 1114 that may execute instructions 1116. The term "processor" is intended to include multi-core processor that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core process), multiple processors with a single core, multiple processors with multiples cores, or any combination thereof.

The memory 1130 may include a memory 1132, such as a main memory, or other memory storage, and a storage unit 1136, both accessible to the processors 1110 such as via a bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172, respectively. For example, the communication components 1164 may include a network interface component or other suitable device to interface with the network 1180. In further examples, communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 can comprise all or portions of the modules of the user interface element generation system 150, including the access module 210, the user interface module 220, the value module 230, the ranking module 240, the presentation module 250, and the communication module 260. The instructions 1116, embodied as processor executable instructions, can provide an algorithmic and programmatic expression of the above-referenced modules and enable the modules to perform the methodologies described herein. The instructions 1116 may be transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently such that the operations be performed in other orders than what is illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although example embodiments have been described, various modifications and changes may be made to these embodiments without departing from the broader scope of embodiments of the present disclosure. Thus, the example embodiments are not intended to be limiting, and can include or exclude various features and/or implementations.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   at least one processor; and
   one or more storage memory devices storing processor-executable instructions that, responsive to execution by the at least one processor, implement:
      an access module that accesses an item listing stored on a network-based publication system and receives profile data of a user interacting with the item listing stored on the network-based publication system, the profile data comprising a user experience level associated with interacting with the network-based publication system;
      a user interface module that analyzes the profile data and the item listing, and dynamically determines a number of user interface elements included in a set of user interface elements to generate for display within the item listing to provide experience-based assistance for interacting with the network-based publication system by determining the number of user interface elements included in the set of user interface elements based at least on the user experience level;
      a value module that dynamically determines a set of values to be associated with the set of user interface elements by utilizing a machine learning model that determines relative importance of one or more factors associated with the item listing, the set of values being based, at least in part, on the item listing, the number of user interface elements included in the set of user interface elements, and the user experience level, each respective value of the set of values being associated with a respective user interface element of the set of user interface elements; and
      a presentation module that causes presentation of the set of user interface elements and the set of values within the item listing.

2. The system of claim 1, wherein the processor-executable instructions implement:
   a ranking module that ranks item listing data associated with the item listing using the machine learning model to determine relative importance of the item listing data, determines at least a subset of the item listing data based on rank, and communicates at least the subset of the item listing data to the value module to use in determining the set of values.

3. The system of claim 2, wherein the ranking module ranks the profile data using the machine learning model to determine relative importance of the profile data, determines at least a subset of the profile data based on rank, and communicates at least the subset of the profile data to the user interface module to use in determining the number of user interface elements included in the set of user interface elements.

4. The system of claim 1, wherein:
the access module identifies a plurality of item listings similar to the item listing based, at least in part, on identifying an interrelation between the item listing and the plurality of item listings; and
the user interface module determines the number of user interface elements included in the set of user interface elements based, at least in part, on the plurality of item listings similar to the item listing.

5. The system of claim 1, wherein the user interface module determines a display configuration for the set of user interface elements based, at least in part, on a predetermined area on a screen of a client device associated with the user.

6. The system of claim 1, wherein:
the value module dynamically determines a range of predetermined values for at least one user interface element of the set of user interface elements; and
the presentation module causes presentation of the range of predetermined values using a slider.

7. The system of claim 1, wherein:
the presentation module causes presentation of a first user interface element of the set of user interface elements that corresponds to submitting a bid with a predetermined value to the network-based publication system for the item listing; and
the presentation module causes presentation of a second user interface element that is different from the set of user interface elements and corresponds to submitting a user-defined bid value to the network-based publication system for the item listing.

8. A method comprising:
accessing, using a computing device, an item listing stored on a network-based publication system;
accessing, using the computing device, profile data of a user interacting with the item listing stored on the network-based publication system, the profile data comprising a user experience level associated with interacting with the network-based publication system;
dynamically determining, using the computing device, a set of user interface elements to display within the item listing to provide experience-based assistance for interacting with the network-based publication system, the dynamically determining the set of user interface elements comprising determining a number of user interface elements included in the set of user interface elements based, at least in part, on the user experience level;
dynamically determining, using the computing device, a set of values to be associated with the set of user interface elements by utilizing a machine learning model that determines relative importance of one or more factors associated with the item listing and by utilizing the profile data, the set of values being based, at least in part, on the item listing, the number of user interface elements included in the set of user interface elements, and the user experience level, each respective value of the set of values being associated with a respective user interface element of the set of user interface elements; and
causing, using the computing device, presentation of the set of user interface elements and the set of values with the item listing at a client device associated with the user.

9. The method of claim 8, wherein the determining the set of values comprises:
obtaining a plurality of item listing data associated with the item listing;
ranking the plurality of item listing data using a machine-learning model to determine a relative importance of each respective item listing data based, at least in part, on interactions with the network-based publication system; and
providing based, at least in part, on the ranking, a value module with a subset of the plurality of listing data to use in the determining the set of values.

10. The method of claim 8 further comprising:
identifying a status associated with the item listing;
generating a value associated with the item listing based, at least in part, on the status; and
communicating a reminder message to the client device, wherein the reminder message includes a notification of the status and the value.

11. The method of claim 8, wherein the determining the number of user interface elements included in the set of user interface elements comprises:
identifying a maximum threshold value associated with the number of user interface elements; and
generating the number of user elements based, at least in part, on the maximum threshold value.

12. The method of claim 8 further comprising dynamically determining a display configuration for the set of user interface elements based, at least in part, on the number of user interface elements.

13. The method of claim 8, wherein the dynamically determining the set of values comprises:
identifying a second item listing associated with the network-based publication system that is similar to the item listing based, at least in part, on an item category;
identifying a value associated with the second item listing; and
dynamically determining the set of values based, at least in part, on the value associated with the second item listing.

14. The method of claim 13, wherein the value associated with the second item listing comprises a winning bid value associated with the second item listing.

15. The method of claim 8, wherein the dynamically determining the set of values comprises:
identifying a time remaining on an auction associated with the item listing; and
dynamically determining the set of values based, at least in part, on the time remaining on the auction.

16. The method of claim 8, wherein the determining the number of user interface elements included in the set of user interface elements based, at least in part, on the user experience level comprises:
identifying a second user interacting with the item listing;
identifying the user experience level of the user is higher than an experience level associated with the second user; and
determining the number of user interface elements based, at least in part, on the user experience level being higher than the experience level associated with the second user.

17. One or more non-transitory computer-readable storage devices comprising processor-executable instructions that, responsive to execution by at least one processor, cause the processor to perform operations comprising:
accessing, using at least the one processor, an item listing stored on a network-based publication system;
accessing profile data of a user interacting with the item listing, the profile data comprising a user experience level associated with interacting with the network-based publication system;

dynamically determining a set of user interface elements to display with the item listing to provide experience-based assistance for interacting with the network-based publication system, the dynamically determining the set of user interface elements comprising determining a number of user interface elements included in the set of user interface elements based, at least in part, on the user experience level;

dynamically determining a set of values to be associated with the set of user interface elements by utilizing a machine learning model that determines relative importance of one or more factors associated with the item listing and by utilizing the profile data, the set of values being based, at least in part, on the item listing, the number of user interface elements, and the user experience level, each respective value of the set of values being associated with a respective user interface element of the set of user interface elements; and causing presentation of the set of user interface elements and the set of values within the item listing at a client device associated with the user.

18. The one or more non-transitory computer-readable storage devices of claim 17, the operations further comprising:

identifying a status associated with the item listing;

generating a value associated with the item listing based, at least in part, on the status; and communicating a reminder message to the client device, wherein the reminder message includes a notification of the status and the value.

19. The one or more non-transitory computer-readable storage devices of claim 17, wherein the determining the set of values comprises:

obtaining a plurality of item listing data associated with the item listing;

ranking the plurality of item listing data using the machine learning model to determine a relative importance of each respective item listing data based, at least in part, on interactions with the network-based publication system; and determining, based on the ranking, a subset of the plurality of item listing data to use for the determining the set of values.

20. The one or more non-transitory computer-readable storage devices of claim 17, wherein the determining the number of user interface elements comprises:

identifying a plurality of item listings similar to the item listing based, at least in part, on identifying an inter-relation between the item listing and the plurality of item listing, wherein the determining the number of user interface elements included in the set of user interface elements is based, at least in part, on the plurality of item listings similar to the item listing.

* * * * *